Nov. 18, 1952     M. R. HUTCHISON, JR     2,618,087
CHANGEABLE PICTURE APPARATUS Filed Nov. 9, 1949     3 Sheets-Sheet 1

MILLER R. HUTCHISON, JR.
INVENTOR
BY Daniel I. Mayne
ATTORNEYS

Nov. 18, 1952 M. R. HUTCHISON, JR 2,618,087
CHANGEABLE PICTURE APPARATUS
Filed Nov. 9, 1949 3 Sheets-Sheet 2

MILLER R. HUTCHISON, JR.
INVENTOR
BY Daniel I. Mayne
ATTORNEYS

Nov. 18, 1952          M. R. HUTCHISON, JR          2,618,087
                    CHANGEABLE PICTURE APPARATUS
Filed Nov. 9, 1949                               3 Sheets-Sheet 3

MILLER R. HUTCHISON, JR.
INVENTOR
BY Daniel J. Mayne
ATTORNEYS

Patented Nov. 18, 1952

2,618,087

UNITED STATES PATENT OFFICE 2,618,087

CHANGEABLE PICTURE APPARATUS

Miller R. Hutchison, Jr., Rochester, N. Y., assignor to Eastman Kodak Company, Rochester, N. Y., a corporation of New Jersey Application November 9, 1949, Serial No. 126,317

16 Claims. (Cl. 40—32)

The present invention relates to changeable picture apparatus for use in advertising, and more particularly to an apparatus of this type which is viewed by transmitted light and by the use of which the illusion of motion can be produced as well as the successive display of different still subjects.

I am aware that changeable picture apparatus of the type having a picture made up of a plurality of surfaces movable into and out of a picture plane and each bearing representations thereon to co-act with one another to produce different pictures is old in the art, as shown by United States Patents 762,519, June 14, 1904, and 1,626,497, April 26, 1927. While the present invention is similar to this art insofar as forming different pictures by moving elements making up the same successively into a picture plane, it is a decided improvement over this art not only in structure, but also in results obtainable. For example, whereas the picture elements of the prior are are such as to be viewed only by reflected light, in the present invention transmitted light is used to reproduce the pictures and is used in a most efficient manner, so that the sign is visible both in the dark and broad daylight. Furthermore, with the present arrangement a sufficient number of different picture elements can be placed on the periphery of a single circular supporting surface to produce a movie sequence or a number of different still subjects without requiring the use of long tapes or bands and thus introducing the known difficulty of moving the same in synchronism.

One object of the present invention is to provide a changeable picture apparatus consisting of a plurality of tubular electric light sources rotatably arranged in side-by-side relation in the form of a bank so as to be rotated in synchronism and each source having arranged around its periphery a plurality of narrow picture elements extending longitudinally thereof which move substantially into and out of a picture plane when the sources are rotated, and in which plane the picture elements co-act with one another to produce different pictures in succession when viewed through a slotted grid whose slots are run longitudinally of the sources and are substantially the same width as the picture elements on the sources.

Another object is to provide a changeable picture apparatus of the type set forth in which diametrically opposed sides of the bank of light sources are covered by slotted grids so that the sign can be viewed from both sides at once, although persons on opposite sides will not see the same picture at the same time.

A further object is to provide a changeable picture apparatus of the type described in which the picture elements on the peripheries of the light sources are in fact transverse segments of a photographic transparency and consist of density gradations whereby the complete picture will appear as a continuous tone picture.

And yet another object is to provide a changeable picture apparatus of the type described in which the peripheries of the light sources are generally opaque, and the picture elements comprise clear, light-transmitting portions therein whereby the pictures will appear as a white block or outline on a darker background.

And yet another object is to provide a changeable picture apparatus of the type set forth in which the picture elements on the respective sources may represent parts of different still subjects and are disposed circumferentially of the sources immediately adjacent one another and the sources rotated intermittently in synchronim to present a series of different still pictures; or the picture elements may represent parts of different pictures which are subject positions of a moving object and the sources are rotated continuously in synchronism to produce the illusion of motion in the subject; or the picture elements may represent parts of different still subjects and be disposed in spaced relation circumferentially of the sources which, when rotated continuously in synchronism, will produce a series of different still subjects in succession with a dark period between each.

Still another object is the method of reproducing the picture elements on the respective sources, which includes the steps of covering the surface of each source, while dark, with a light-sensitive emulsion, exposing successive longitudinal segments of the peripheries of the emulsion to transverse portions of different pictures through the slits of the grid by indexing the sources relative to the grid between each exposure, processing the exposed emulsion to a transparency, and replacing the sources and/or transparencies in the relation they were when exposed, energizing the sources, and viewing the same through the slotted grid.

And still another object is to provide a picture-bearing member adapted to be held in wrapped relation on the light sources comprising a photographic transparency which was initially exposed as above set forth and which includes a plurality of parallel elongated picture elements extending lengthwise of the transparency so that, when wrapped around the source, or slid thereonto as a sleeve, in proper orientation with similar transparencies on the other sources, the picture elements thereon will co-act with others as the sources are rotated to produce different pictures. Such a picture-bearing member lends itself to ready exposure and processing separate from the source and makes it possible to readily replace any one source in the complete sign which might have burned out or otherwise become damaged.

The novel features that I consider characteristic of my invention are set forth with particularity in the appended claims. The invention itself, however, both as to its organization and its method of operation, together with additional objects and advantages thereof, will thus be understood from the following description when read in connection with the accompanying drawings in which:

Fig. 5 is a perspective view showing what one of the lamps used in a sign of the type shown in Fig. 3 for displaying pictures consisting of blocks of white against the dark background might look like.

Like reference characters refer to corresponding parts throughout the drawings.

Essentially a changeable picture apparatus according to the present invention comprises a plurality of tubular electric-light sources rotatably mounted in parallel side-by-side relation in the form of a bank so that each portion of each source moves substantially into and out of a common picture plane when rotated. The periphery of each source carries a plurality of elongated picture elements representative of a transverse segment of a different complete picture. These picture elements are so disposed on the periphery of the sources that those forming a part of any one picture extend longitudinally of the source, while those representative of parts of different pictures are arranged circumferentially of the source. This bank of light sources is covered by an opaque grid lying substantially in the picture plane and provided with a plurality of parallel spaced slots, one slot being in front of, and extending the full length of, each of the light sources. These slots are substantially the same width as the picture elements on the sources, so that they serve to mask off all elements on the periphery of the sources except the ones in the picture plane. Accordingly, as the light sources are rotated in synchronism, the picture elements thereon move into the picture plane in succession and co-act to successively produce different pictures on the face of the grid. Notwithstanding the fact that these individual picture elements, co-acting to produce any one picture, are separated from one another by dark spaces several times wider than themselves, from a reasonable viewing distance these dark spaces completely disappear or are sufficiently inconspicuous so that the individual picture elements merge into and form a single picture which will appear as a continuous tone picture if the picture elements are of a character to present such a picture.

Referring now to the drawings, a changeable picture apparatus constructed in accordance with a preferred form of my invention comprises a plurality of tubular electric lamps 10, each rotatably mounted at opposite ends in vertical support plates 11. These lamps 10 may be conventional fluorescent lamps or any gas-filled lamp, i. e., neon, argon, etc., or any other similar type lamp having substantially uniform illumination throughout their length and sufficient brightness. As shown, these lamps 10 are disposed in a bank in parallel side-by-side relation and are preferably spaced just far enough apart so that their peripheries are free from rubbing contact.

Means are provided for driving all of these lamps in synchronism, and to this end I have shown each lamp provided with a spur gear 12 connected to each other through an idler gear 13. From the following description it will be understood that there is no reason why all of the lamps have to be rotated in the same direction to obtain the desired changeable picture effect, so that if a backlash difficulty is introduced by the use of idler gear 13, these may be eliminated, and the spur gears of each lamp can be directly engaged, in which case alternate lamps will be rotated in opposite directions to keep the lamps energized. During rotation opposite ends of the lamps are provided with slip rings 14, or the equivalent, connected to the electrodes of the lamps, said slip rings being insulated from the axle portion of the lamp and gear 12 thereon by a sleeve 15 and engaged by a brush-type contact 16 adapted to be connected to a source of potential, not shown.

The periphery of each lamp 10 carries a plurality of elongated picture elements of equal width extending longitudinally of the lamps and each of which represents a transverse segment of a different complete picture. On each lamp the picture element or elements embracing the same arcuate portion of the lamp periphery will represent a part of one picture, while those embracing succeeding arcuate portions of the lamp periphery will represent parts of different pictures. As the lamps are rotated in synchronism, the longitudinal picture elements are moved substantially into and out of a common picture plane determined by that plane tangent to the periphery of each of the lamps in the bank, and the elements on the several lamps will co-act in this plane to produce different complete pictures in succession.

Figure 1:
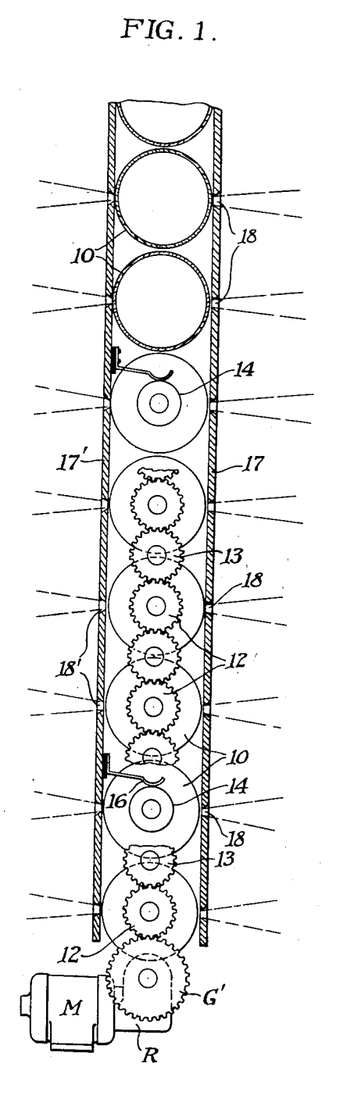
Fig. 1 is a vertical sectional view of a portion of a display apparatus constructed in accordance with a preferred embodiment of the present invention.
Figure 2:
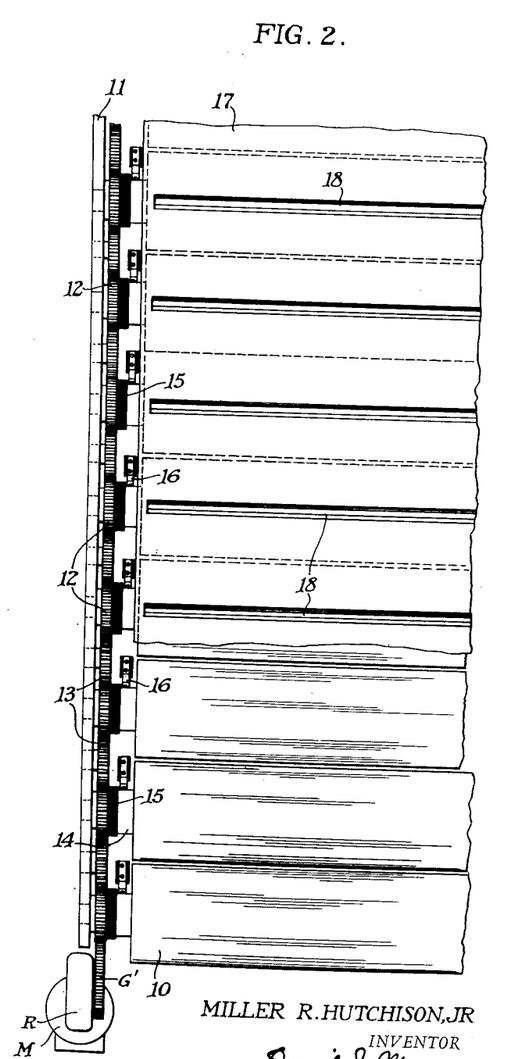
Fig. 2 is a partial front-elevational view looking at one face of the display apparatus shown in Fig. 1 but with the grid removed from the lower portion thereof, and with the driving means for the lamps exposed to view.

As shown in Figs. 1 and 2, an opaque grid 17 is mounted in front of the bank of lamps 10 as close to said picture plane as possible and still allow the lamps to rotate freely. This grid includes a plurality of spaced parallel slots 18 which are so arranged that one of said slots extends longitudinally of each of the lamps and is preferably centered with respect to the diameter of the lamp normal to the picture plane. Each of these slots 18 is substantially the same width as the longitudinal picture elements on the lamp, whereby as one longitudinal picture element is indexed into the picture plane, on each lamp, the slots allow a person viewing the grid from the front to see only the elements opposite the slots, and the grid masks off the others. Thus, as the lamps are rotated relative to the grid 17 in proper synchronism, only those picture elements constituting parts of a given picture will be visible through the grid at any one time, and consequently successive pictures will be visible to one viewing the grid.

By placing another grid 17', similar to grid 17, on the other side of the bank of lamps 10 it will be appreciated that the same group of pictures can be viewed from both sides of the apparatus, although the same picture will not appear on opposite sides at the same time. Offhand, it might appear that the picture appearing on one side of the bank of lamps would be upside down because of the different direction of rotation of the lamp peripheries in these two picture planes. However, when it is remembered that no one picture element will ordinarily be wide enough to include a portion of a picture large enough to show definition or image resolution in the direction of rotation of the lamps, but will only constitute a density or gradation or highlight in this direction, it will be appreciated that these will add up in the same manner on each side of the bank of lamps to make an upright picture despite the difference in direction of the movement in these two picture points.

At least two different types of pictures can be reproduced with this apparatus, namely, pictures constituting a white outline or block against a dark background as in printed signs, and continuous tone pictures such as ordinary photographic transparencies. The picture elements making up these different types of pictures will be of a different character, although of the same shape, and different effects can be obtained by varying the arrangement of the picture elements on the lamps and/or the manner of rotating the lamps.

Because the case where the subject matter to be reproduced is a white outline or block on a dark background is the easiest to visualize and illustrate by way of line drawings, I have chosen an example of such a case to illustrate in the drawings and will describe the same.

Figure 3:
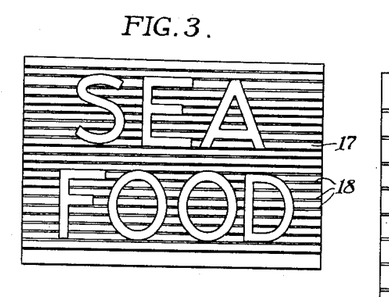
Fig. 3 schematically illustrates on a reduced scale how a sign constructed in accordance with the present invention and adapted to display the words "Sea Food" as one picture would appear to a person viewing the same.
Figure 4:
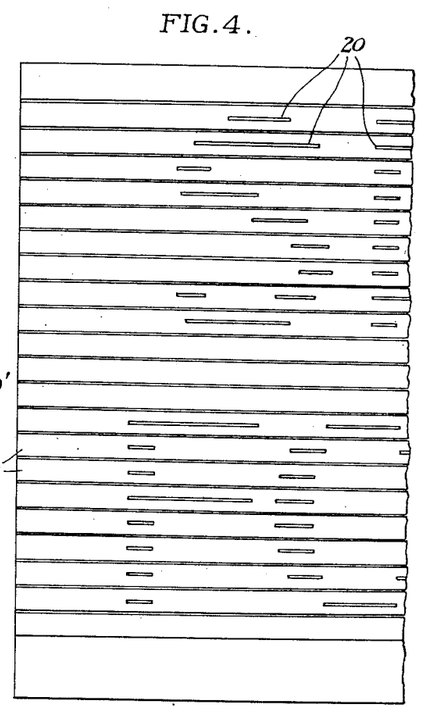
Fig. 4 is a schematic front view of the lamp bank constituting part of the present display apparatus with the slotted grid omitted and showing the manner in which the individual picture elements of each lamp co-act in a common picture plane to form a complete picture. In this figure only one set of picture elements is shown on each lamp in order to avoid the confusion which would be introduced if more than one set were shown.

Suppose one picture or subject matter which is to be reproduced on this apparatus are the words "Sea Food," as shown in Fig. 3. The number of lamps making up the sign will depend upon the size of sign desired. In Fig. 4 I have shown this sign enlarged with respect to Fig. 3 and with the slotted grid removed from in front of the bank of lamps, so that the picture elements on the peripheries making up this subject are exposed to view. In this type of sign the entire periphery of the lamps will be generally opaque, and the picture elements on each tube will comprise elongated, clear, light-transmitting slots 20, each extending longitudinally of the lamps. In Fig. 4 I have not attempted to illustrate the opacity of the major portion of the lamp peripheries because of the confusion which might be introduced between the opaque portions of the lamps and the light-transmitting picture elements by the shading necessary to do this. This relation is indicated, however, in Fig. 5 which shows a lamp separated from assembled relation with a group with which it is to cooperate.

As clearly indicated in Fig. 4, the first or top lamp will include longitudinal picture elements 20 representing a narrow transverse portion at the top of the "S," the "E," and also of the "A," although the latter letter is not included in this figure. Successive lamps vertically downward of the bank will include picture elements 20 representing other transverse portions of the three letters in the words "Sea Food" which are vertically spaced relative to each other. This sign would probably be made to display other subject matter as the lamps are rotated, such as the name of the establishment advertising, the outline of a lobster, a fish, etc. These different subjects would be made up of picture elements 20 on each of the lamps similar to those shown but displaced circumferentially of the lamps to be brought into view in succession as the lamps are rotated in synchronism. In Fig. 4 the picture elements which would appear circumferentially of the lamps depicting subject matter other than the words "Sea Food" have not been shown in order not to confuse the elements forming parts of the words "Sea Food."

When this bank of lamps is covered with a slotted grid 17 (see Fig. 1) so that the slots 18 thereof, which are substantially equal in width to the picture elements 20, line up with the respective lamps, then the grid will mask off all of the picture elements not appearing substantially in the viewing or picture plane. Notwithstanding the fact that only narrow spaced, transverse portions of the entire subject actually appear on the face of the grid, it has been found that if the grid is viewed from a reasonable distance, which by the way is still within the resolving power of the eye for the dark spaces between the grid slots, the dark spaces between the picture elements will completely disappear or be reduced to an extent where they are unobjectionable, and the illuminated picture elements will appear to merge and form a complete image of the subject matter. In other words, in the case of the words "Sea Food," above mentioned and disclosed in the drawings, although the letters actually consist of separated longitudinal picture elements 20, as indicated in Fig. 4, when the sign is viewed from a reasonable distance through the slotted grid 17, the letters of the words will appear to be continuous, as indicated in Fig. 3.

The exact theory as to why these picture elements appear to merge into a complete picture, despite the separation, when viewed at a reasonable distance within the resolving power of the eye is not known. It is known, however, that this result is dependent upon the picture elements' being illuminated by transmitted light, so that they appear as bright sources against a dark background. This phenomenon can be readily illustrated by piercing a sheet of black paper with a plurality of pin holes arranged in a line and spaced as much as ⅛ of an inch apart. If these pin holes are illuminated by a bright source from the rear of the sheet, then, even though they are viewed from a distance well within the resolving power of the eye or the pin holes, the eye, instead of seeing them as individual illuminated pin holes, as it could, will choose to see them as a continuous line of light. This phenomenon appears to be due to a psychological action of the human eye, which may be called assimilation and which means a perceptual filling in of subject matter incompletely shown by separate elements making up parts of the same.

The number of lamps necessary to make up a given sign will, of course, depend upon the size of the subject it is desired to reproduce and also the nature of the subject. For instance, with signs which are to consist of simple block letters or simple figures consisting of white blocks on a dark background, then only a few lamps are needed, since each picture element can include a substantially wide transverse section of the complete picture. On the other hand, if the subject to be displayed includes an extremely irregular outline which must be reproduced fairly accurately to portray the figure, then the picture elements will have to be narrower and more numerous to give this desired definition, and the number of lamps required will be greater. By way of example, I have found that in reproducing a lettered sign of the type disclosed, picture elements 20 and the grid slots 18 may be as wide as ¼ of an inch, and the slots 18 spaced on 1½ inch centers, and the letters reproduced will appear substantially as continuous lines of light at a distance between 15 and 20 feet from in front of the grid.

This apparatus can also be used for reproducing black-and-white or colored pictures in continuous tone. In this instance each longitudinal picture element 20 on the lamps will consist of a transverse segment of a transparency to be reproduced, and each element will extend substantially the full length of the lamps and consist of a gradation of black and white or color densities representative of the portion of the picture they represent. In other words, instead of looking at a complete transparency illuminated from the rear, the several lamps of the sign will include transverse segments of the transparency or complete pictures which, when simultaneously viewed through the slotted grid 17 from greater than a reasonable distance, will appear to the eye as a complete transparency of the subject, with the dark spaces between the slots 18 non-existent or sufficiently reduced in apparent size so as to be unobjectionable so far as definition and detail in the picture are concerned. The same phenomenon, which I have chosen to refer to above as "assimilation" of the picture by the eye, will occur in the case where the picture elements are parts of a transparency as in the case where the elements are clear, light-transmitting areas. Even though it is impossible, because of the curvature of the picture elements, for all parts of any one picture element to be exactly in the picture plane at one time, this fact does not appear to distort the apparent picture in any way, and the curvature of the individual picture elements is not apparent, even when they are of substantial width. This condition may be corrected for to some extent, due to the fact that when the picture elements are made, they are exposed photographically on the curved surface, as will be set forth. At any rate, under normal conditions the picture elements will be so narrow that no one portion thereof will be very far out of the picture plane with respect to another portion, and for all practical purposes the entire element can and will be considered as movable into a common picture plane at one time.

I have found that sufficient brilliance will be obtained from conventional fluorescent lamps when only ten per cent of the face of the grid 17 consists of lamp surface, such being about ten degrees, measured at the circumference of the lamps. Accordingly, if the lamps are covered with picture elements, there may be about 36 sets of such elements disposed about each lamp without overlapping, allowing the successive presentation of 36 separate pictures, each of which covers the whole grid face. Almost any degree of definition can be obtained in the presented picture, depending upon size of the sign, the diameter of the lamps used, etc. For example, a definition of 500 "lines" to the picture can be obtained by the use of 500 lamps in the bank.

The picture elements 20 may be applied to the lamp peripheries in several different ways, depending upon the character of the subject matter to be reproduced and the manner in which it is to be presented. Should the picture to be displayed consist of letters or other subject matter which can be reproduced with picture elements in the form of clear, light-transmitting slits, as in Fig. 3, the lamp peripheries could be first entirely covered with an opaque coating, and then the coating could be scraped off the lamps to form the desired picture elements through the use of a stencil placed over the face of the grid and changed upon indexing of the lamps, or the lamps could be covered with a steel or paper tape in which the proper arrangement of longitudinal slits constituting the picture elements are formed.

Figure 12:
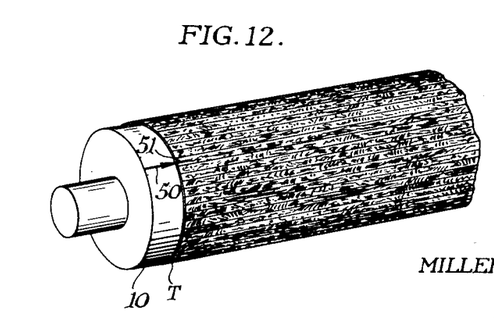
Fig. 12 is an enlarged prospective detail showing one way of indexing the individual film sleeves relative to their lamps so that the films after processing can be returned to their lamps in the same order and relative position on the lamp as when exposed.

Another, and probably the preferably, way would be to form the picture elements 20 on the lamp peripheries photographically, since this procedure is adaptable to pictures which are to be reproduced as blocks of white against a dark background or are to be reproduced as continuous tone pictures. One way of doing this, and the preferable way, would be to wrap a light-sensitive film around each lamp while it is dark, fixing the film sleeve so formed against rotation relative to the lamp, and indexing the position of each film sleeve on its lamp by the use of index lines on the film and lamp periphery, as shown in Fig. 12 where 50 designates an index mark on the periphery of the lamp 10 and 51 designates an index mark placed on the edge of the transparency T. Then with the lamp inserted into the bank behind the grid 17, and with the lamps stationary, a picture to be reproduced is projected onto the face of the grid, exposing the lines of emulsion behind each grid slot 18 to a different transverse segment of the picture. The lamps are then synchronously indexed to move the opposed emulsion from behind the slots in the grid and to move an unexposed area of emulsion into alignment with the slots, and another exposure is made through the grid. This exposure procedure is repeated with different pictures projected on a grid face and indexing the lamps between each exposure until the entire peripheries of the film sleeve on the lamps are exposed, or until a portion is reached where a further indexing of the lamps would cause a double exposure. After the film sleeves are numbered in accordance with their position in the bank, as indicated by the numeral 2 in Fig. 12 which might designate this particular film or transparency as belonging on the second lamp from the top of the bank, they are slipped off the lamps and opened up and processed in the usual manner to form visible images from the latent images or to form a transparency. Usually the transparency should be a positive to properly depict the subject matter and this can be readily obtained with a black-and-white transparency by the usual contact printing process. If the film used is a color films, then the positive color transparency can be obtained directly on the one film by known processing techniques.

When the transparencies are dry, they will be again rolled onto sleeves, and the sleeves will be slid back onto the same lamps on which they were exposed and in the same orientation relative to each other as when exposed. The numbers on the films will make it possible to return the transparencies to the proper lamp of the bank, and the index lines being on the film will facilitate the proper orientation of the sleeves on the respective lamps. Now if the lamps are energized, and the face of the grid is viewed from a reasonable distance, the pictures originally exposed on the films will become apparent in succession as the lamps are rotated and without the appearance of dark lines across the picture or at least without dark lines appearing so conspicuously as to be objectionable.

Figure 6:
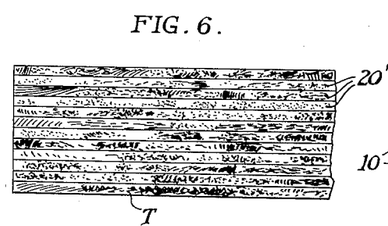
Fig. 6 is a schematic view illustrating what a transparency having picture elements for producing continuous tone pictures might look like in a flat condition and removed from the lamps of the sign.

By the use of this technique a plurality of novel transparencies are obtained, each transparency in itself comprising a plurality of longitudinal picture elements consituting transverse segments of different complete pictures and which, when viewed in the proper combination with picture elements of other similar transparencies, will produce a group of different pictures. In Fig. 6 I have illustrated what a photographic transparency formed in this manner might look like when in a flat condition and not rolled lengthwise in the form of a sleeve to slip into a lamp. In this transparency T the picture element 20' are shown as density gradations which will extend the full length of the lamp so that each will depict a part of a continuous tone picture, and since they are immediately adjacent each other, they might constitute individual and successive subject positions of a moving subject so as to give the illusion of motion in the subject when the lamps are continuously rotated.

Should a lamp burn out in a sign of this type, all that is necessary is to slip the film sleeve off therefrom and onto a new lamp which can be readily placed in the bank. If for any reason one of the transparencies becomes damaged, it can be readily replaced by another one made from the original negative or made at the same time as the original. With this technique, a given sign can be changed at any time by slipping the new set of transparencies onto the lamps in place of the ones previously used. A great many of these signs could be readily supplied with new subject matter from a central source having a sign exactly like those in the field on which the transparencies could be exposed and the final transparencies being readily duplicated in great numbers photographically. Accordingly, these picture-bearing members or transparencies and the method of making them constitute a part of the present invention.

An alternative way of putting these picture elements on the lamps would be to coat the surface of the lamps directly with a light-sensitive emulsion. The picture element would then be exposed and processed in the same manner as set forth above; only now the entire lamp would be handled as the film sleeve was during processing. One different step in the latter case would be the necessity of printing the picture elements to a positive by the usual reversal process used in the production of 16-mm. movie film, since the emulsion, being on the lamp, would not lend itself to a contact printing step.

Figure 5:
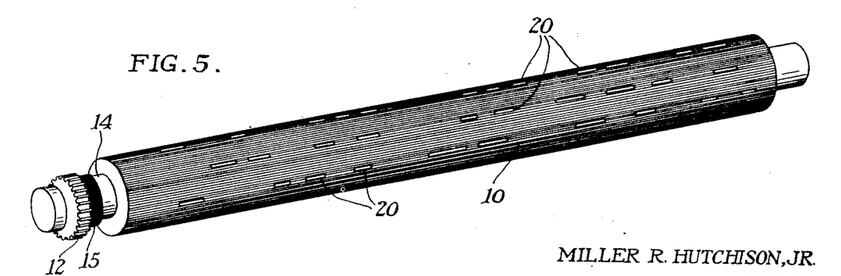
Figure 7:
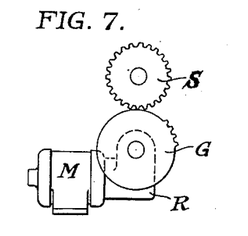
Fig. 7 shows one form of intermittent drive which could be used for the lamps of the sign.

The orientation of the picture elements 20 or 20' circumferentially of the lamps 10 may vary somewhat, depending upon what sort of changeable picture effect is desired and what type of driving means is used for the lamps; for example, if it is merely desired to produce a series of different still subjects in succession on the face of the grid 17, this may be done in two different ways: first, the picture elements on each lamp denoting parts of different pictures could be arranged in adjacent relationship circumferentially of the lamps, and the drive for the spur gears of the lamps could be intermittent in nature. While any number of different intermittent driving means are available for this use, in Fig. 7 I have shown a representative one as consisting of a motor M driving a mutilated gear G through a suitable gear reduction R, said mutilated gear engaging a spur gear S which may in turn engage one of the gears 12 or 13 forming the drive for the lamps; secondly, a continuous drive for the lamps may be used and the picture elements on the lamps separated from each other circumferentially by a dark area as indicated in Fig. 5. In Fig. 1 I have a continuous drive for the lamps consisting of electric motor M, driving a spur gear G' through a suitable gear reduction R, said spur gear G' engaging one of the gears 12 forming the drive for the lamps. With this arrangement a given picture will wipe on and off of the grid face as the lamps rotate, but each picture will be distinctly separated from the successive one by a dark period. With this latter arrangement a fewer number of different pictures can be placed on each lamp because of the dark areas. This same effect could be obtained without reducing the number of pictures on the tubes by turning the lamps on and off at proper intervals during their rotation.

Figure 8:
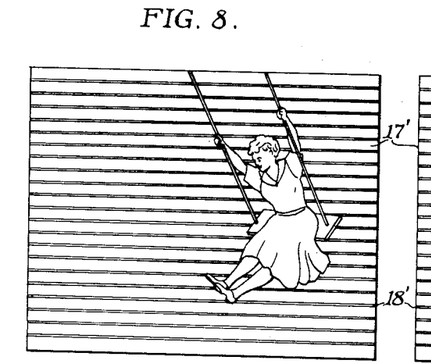
Figs. 8–11 schematically illustrate how the illusion of motion of a subject can be produced with a display of this type.
Figure 9:
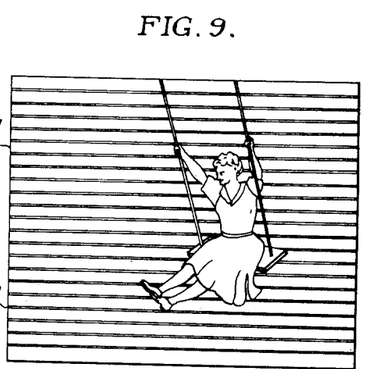
Figure 10:
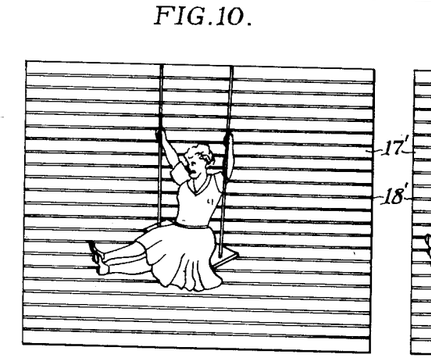
Figure 11:
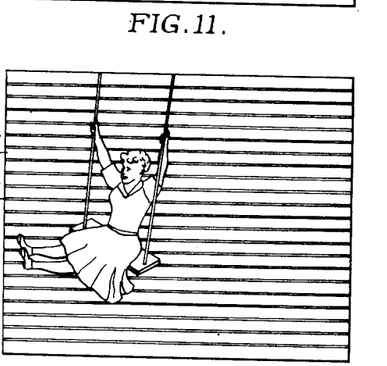

If a motion effect is desired in a picture produced by this type of sign, the picture elements on each lamp would denote different subject positions in the motion, and they would be disposed about the lamps immediately adjacent each other, the lamps would be rotated continuously. It will be understood that as one group of picture elements denoting one subject position are being wiped off the face of the grid, the succeeding subject position will be wiped on. Because of this so-called dissolving action between subject positions, a very smooth motion can be produced on the face of the grid with fewer "frames" than would be required with a conventional motion-picture film, and because of this a movie sequence of reasonable length can be placed directly on the circumference of a series of lamps of reasonable dimension. In Figs. 8–11 applicant has endeavored to show schematically how motion in a subject might be produced in this way. In each of these figures the grid is designated as 17' and the slots therein as 18'. In Fig. 8 the lamps are shown in one position of rotation where the picture elements on the group of films coact to show the girl at the top of a back swing. In each of the other figures the lamps are rotated to positions where the girl is shown in another phase of the swinging motion. Now if the lamps are rotated continuously, the subject will go through these different phases in succession and will appear to be moving.

From the above description it will be obvious that a changeable picture apparatus constructed in accordance with the present invention is very versatile as to the subject matter displayable thereon and that the subject matter can be varied from time to time by merely changing transparency sleeves on the lamps and/or the manner of driving the lamps. Lamps or pictures may be changed readily, inexpensively, and quickly by separation from the sign and using individual replacements. The mechanical structure of the sign is simple and relatively cheap, and the structure occupies little space except in the planes used to effect displays. The low wattage of the lamps and the small motor required to drive the lamps makes operation and installation costs low. Despite their low wattage, fluorescent lamps produce a brilliant illumination which, when used in the manner set forth to illuminate the picture elements by transmitted light, results in a display sign which is not only brilliant at night, but which is also brilliant and useful in broad daylight. The novel photographic transparencies which are used on this display apparatus, as well as the novel method of preparing them, makes it possible for a basic apparatus to be used for producing an unlimited number of different displays which can be readily installed on the apparatus without need of specially trained personnel. They also make it possible for such transparencies to be prepared in any number by a supplier for ready distribution in sets to sign owners as they wish to change the subject matter of their signs or as selected individual units for replacement purposes. Another unique feature of this apparatus is that it returns to the pictorial starting point periodically without retrogression, as is necessary in flat signs of this nature using flat lined screens and flat grid-type composite pictures.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim is new and desire to secure by Letters Patent of the United States is:

1. A changeable display apparatus comprising a plurality of tubular electric lamps rotatably disposed in parallel side-by-side relation so that all portions on the periphery of each lamp move into and out of a common picture plane as the lamps are rotated; the periphery of each lamp provided with a plurality of individual elongated light-transmitting picture elements of equal width extending longitudinally and disposed circumferentially thereof, each picture element on the individual lamps constituting a separate elemental and incoherent portion of a different picture and one of the picture elements on each lamp forming a portion of the same picture as one of the picture elements on each of the other lamps, and said picture elements on the several lamps oriented to co-act with one another in the picture plane during rotation of the lamps to produce different complete pictures in succession; an opaque grid disposed substantially in said picture plane in front of said lamps and provided with a plurality of parallel spaced slots each of which extends longitudinally of a different lamp and is of such width as to correspond to the width of said individual picture elements; and means for rotating said lamps in synchronism relative to the slots in said grid to cause different pictures to be viewed through said grid in succession.

2. A changeable display apparatus comprising a plurality of tubular electric lamps rotatably disposed in parallel side-by-side relation so that each portion on the periphery of each lamp moves into and out of two common picture planes diametrically disposed on opposite sides of the lamps as they are rotated; the periphery of each lamp provided with a plurality of individual light-transmitting picture elements of equal width extending longitudinally and disposed circumferentially of the periphery thereof, each picture element on the individual lamps constituting a separate elemental and incoherent portion of a different picture and one of the picture elements on each lamp forming a portion of the same picture as one of the picture elements on each of the other lamps, and said picture elements on the different lamps oriented to co-act with one another in each of said picture planes during rotation of the lamps to produce different complete pictures in succession; an opaque grid disposed substantially in each of said picture planes in front of said lamps, and provided with a plurality of parallel spaced slots each of which extends longitudinally of a different lamp and is of such width as to correspond to the width of said individual picture elements; and means for rotating said lamps in synchronism relative to said grids to cause different pictures to be viewed through each of said grids in succession.

3. A changeable picture apparatus comprising a plurality of tubular electric lamps rotatably disposed in a bank in side-by-side parallel relation so that all portions of the periphery of each lamp move substantially into and out of a common picture plane as the lamps are rotated; the periphery of each lamp being generally opaque and provided with a plurality of individual elongated light-transmitting picture elements of equal width and arranged in spaced relation in axial series, each of which axial series constitutes a part of one picture, and with a plurality of such axial series disposed circumferentially of each lamp, said axial series of elements on the several lamps oriented to co-act with one another in the picture plane during rotation of the lamps to produce different pictures in succession; an opaque grid disposed substantially in said picture plane in covering relation with said bank of lamps, and provided with a plurality of parallel spaced slots each of which extends longitudinally of a different lamp and is substantially equal in width to the said picture elements; and means for rotating said lamps in synchronism relative to said grid to cause different pictures to appear on the face of said grid in succession.

4. A changeable picture apparatus according to claim 3 in which the means for rotating said lamps in synchronism rotates them continuously, and in which each axial series of picture elements on the individual lamps is spaced from the other circumferentially of the lamps, whereby different pictures appear in succession on the face of the grid with a dark period between each picture.

5. A changeable picture apparatus according to claim 3 in which the means for rotating said lamps in synchronism rotates them intermittently, and in which each axial series of picture elements on the individual lamps is immediately adjacent one another circumferentially, whereby different pictures appear in succession on the face of the grid with a dissolve action during the change, and each picture remains on the grid for a selected interval.

6. A changeable picture apparatus according to claim 3 in which the picture, of which each axial series of picture elements constitute a part, depicts one subject position of a moving subject, and successive axial series of picture elements depict associated subject positions of the same moving subject, and in which the means for rotating the lamps rotates them continuously relative to said slots to produce the illusion of the motion of the subject to one viewing the grid.

7. A changeable picture apparatus comprising a plurality of tubular electrical lamps rotatably disposed in a bank in parallel side-by-side relation so that all portions of the periphery of each lamp move substantially into and out of a common picture plane as the lamps are rotated; the periphery of each lamp being generally opaque and provided with a plurality of spaced light-transmitting picture elements of equal width extending longitudinally and spaced circumferentially of the periphery thereof and arranged to co-act with one another in the picture plane during rotation of the lamps to produce different pictures of still subjects in succession; an opaque grid disposed substantially in said picture plane in covering relation with said bank of lamps, and provided with a plurality of parallel spaced slots each of which extends longitudinally of a different lamp and is of such width as to correspond to the width of said individual picture elements; and means for intermittently rotating said lamps simultaneously and in synchronism relative to the slots in said grid to successively bring the picture elements of each lamp co-acting to produce a given picture into alignment with the slots in said grid and allow them to remain there for a selected time, whereby a succession of different still pictures is apparent to one viewing said grid.

8. A changeable display apparatus comprising a plurality of tubular electric lamps rotatably disposed in a bank in parallel side-by-side relation so that all portions of the periphery of each lamp move substantially into and out of a common picture plane; a plurality of elongated picture elements of equal width located on the periphery of each lamp so that each individual element extends axially of the lamp and the elements are disposed circumferentially of the lamp; each picture element on each lamp consisting of a gradation of densities representative of a part of different complete pictures, and the picture elements on the separate lamps arranged to co-act with one another in the picture plane during rotation of the lamps to produce different continuous-tone pictures in succession; an opaque grid disposed substantially in said picture plane in covering relation with said bank of lamps, and provided with a plurality of parallel spaced slots each of which extends longitudinally of a different lamp and is substantially equal in width to the picture elements thereon; and means for rotating said lamps in synchronism relative to said slots to successively bring the picture elements of each lamp co-acting to produce a given picture into alignment with the slots in said grid.

9. A changeable display apparatus according to claim 8 in which the picture elements on each lamp are photographically prepared transparencies integral with said lamp.

10. A changeable display apparatus according to claim 8 in which the picture elements on each lamp comprise a photographically prepared transparency held in wrapped relation on each lamp to rotate therewith; and cooperating means on each transparency and lamp for indexing the transparencies on their respective lamps so that the picture elements on the several lamps will co-act in the desired manner when the lamps are rotated in synchronism.

11. A changeable display apparatus according to claim 8 in which the picture elements on each lamp comprise a photographically prepared transparency held in wrapped relation on each lamp to rotate therewith, and in which each picture element represents a portion of a different subject position of a moving subject; and in which the lamp-rotating means comprises means for rotating the lamps continuously in synchronism so that the picture elements on the different lamps co-act to display different positions of the subject in succession on the face of said grid and thus create the illusion of motion in the subject.

12. A picture-bearing member adapted to be held in wrapped relation on a tubular light source and rotated behind a narrow elongated slot in a changeable display apparatus of the type described, and comprising a substantially rectangular photographic transparency adapted to be wrapped around said tubular light source with its long dimension extending longitudinally of the light source, said transparency composed of a plurality of parallel picture elements extending lengthwise of the transparency, and each picture element consisting of a continuous tone record representative of a transverse element of different pictures, and each picture element being substantially equal in width to each other and to the slot behind which the tubular light source is to rotate.

13. A picture-bearing member according to claim 12 in which each picture element is immediately adjacent the one parallel thereto.

14. A picture-bearing member according to claim 12 in which the picture elements are spaced from one another transversely of the transparency by an opaque area.

15. A picture-bearing member according to claim 12 in which each picture element is representative of a portion of a picture which depicts a different subject position of a moving subject, and in which each picture element is immediately adjacent the one parallel thereto.

16. The method of making picture-bearing members to be used in the changeable picture apparatus disclosed and wherein a plurality of picture-bearing members, each including a plurality of light-transmitting picture elements representing a part of different pictures, are carried in wrapped relation on a plurality of tubular light sources arranged in a bank behind a grid having a plurality of spaced parallel slots behind each of which one of said tubular light sources is rotatably mounted so that as the light sources are rotated in synchronism, the picture elements on the several light sources co-act to produce different pictures when viewed through said slots, and comprising the steps of covering the periphery of each light source with a light-sensitive emulsion; placing the light sources behind their respective slots in the grid; with the light sources dark and stationary, exposing the emulsion thereon to a picture projected on the front of said grid; indexing the light sources together to bring an unexposed portion of the emulsion thereon opposite the respective slots and exposing the emulsion to another picture projected on the front of the grid, repeating this indexing of the light sources and exposure to different pictures until the periphery of each light source has a plurality of different picture elements exposed thereon; processing the exposed emulsion on each light source to make the latent images thereon visible; then replacing the light sources and their respective processed picture-bearing members in the bank behind the grid in the same order in which they were exposed and with the individual light sources relatively indexed so that they co-act to produce one of the recorded pictures on the face of the grid when its sources are energized and the picture elements are viewed by transmitted light.

MILLER R. HUTCHISON, JR.

REFERENCES CITED

The following references are of record in the file of this patent:

UNITED STATES PATENTS

| Number | Name | Date |
|---|---|---|
| 1,374,921 | Houston | Apr. 19, 1921 |
| 1,445,874 | Diamond | Feb. 20, 1923 |
| 1,626,497 | Archipenko | Apr. 26, 1927 |
| 1,823,075 | Wilson | Sept. 15, 1931 |
| 1,858,661 | Decker | May 17, 1932 |
| 1,918,705 | Ives | July 18, 1933 |
| 1,961,973 | Jenkins | June 5, 1934 |
| 2,298,666 | Whitelaw | Oct. 13, 1942 |
| 2,388,646 | Ryan | Nov. 6, 1945 |
| 2,475,497 | Harrold et al. | July 5, 1949 |
| 2,482,886 | VanGieson | Sept. 27, 1949 |

FOREIGN PATENTS

| Number | Country | Date |
|---|---|---|
| 11,263 of 1902 | Great Britain | Mar. 26, 1903 |